(12) United States Patent
Al-Amin et al.

(10) Patent No.: US 6,439,604 B1
(45) Date of Patent: Aug. 27, 2002

(54) SIDE CURTAIN ASSEMBLY INCLUDING FILL TUBE

(75) Inventors: Ahmad K. Al-Amin, Higley; Jerome W. Emery; Chad L. Greenlee, both of Gilbert, all of AZ (US)

(73) Assignees: TRW Inc., Lyndhurst, OH (US); TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/491,338

(22) Filed: Jan. 26, 2000

(51) Int. Cl.⁷ .............................................. B60R 21/26
(52) U.S. Cl. .................... 280/736; 280/730.2; 280/737; 280/728.2
(58) Field of Search ................................. 280/737, 736, 280/731, 732, 741, 742, 740, 730.1, 730.2, 728.1, 729, 743.1

(56) References Cited

U.S. PATENT DOCUMENTS

| | | | |
|---|---|---|---|
| 3,197,234 A | | 7/1965 | Bertrand ..................... 280/150 |
| 3,674,059 A | | 7/1972 | Stephenson ..................... 141/4 |
| 3,770,387 A | | 11/1973 | Loomba ..................... 23/281 |
| 3,774,807 A | | 11/1973 | Keathley et al. ............... 222/3 |
| 3,810,655 A | * | 5/1974 | Pracher ..................... 280/150 |
| 3,856,181 A | * | 12/1974 | Merrell ..................... 222/5 |
| 3,865,273 A | * | 2/1975 | Zeigler ..................... 222/5 |
| 3,904,222 A | | 9/1975 | Bursott et al. ............... 280/150 |
| 3,946,911 A | * | 3/1976 | Morane et al. ......... 222/402.11 |
| 4,004,827 A | | 1/1977 | Kondo et al. ................ 280/742 |
| 5,683,107 A | * | 11/1997 | Headley et al. ............. 280/741 |
| 5,813,694 A | * | 9/1998 | Jeong ......................... 280/737 |
| 6,010,153 A | * | 1/2000 | Halas et al. ................ 280/737 |
| 6,042,146 A | * | 3/2000 | Bauer et al. ................ 280/737 |
| 6,070,903 A | * | 6/2000 | Beisswenger et al. ...... 280/736 |
| 6,082,761 A | * | 7/2000 | Kato et al. ............... 280/730.2 |
| 6,135,492 A | * | 10/2000 | Zimmerbeutel et al. . 280/730.2 |
| 6,142,514 A | * | 11/2000 | Yamato et al. .............. 280/736 |
| 6,161,481 A | * | 12/2000 | Shirk et al. ................. 102/530 |
| 6,299,200 B1 | * | 10/2001 | Bowers et al. ........... 280/730.2 |

* cited by examiner

Primary Examiner—Brian L. Johnson
Assistant Examiner—J. Allen Shriver
(74) Attorney, Agent, or Firm—Tarolli, Sundheim, Covell, Tummino & Szabo L.L.P.

(57) ABSTRACT

A vehicle occupant protection apparatus (10) comprises an inflatable vehicle occupant protection device (14) and an inflator (20) for providing inflation fluid for the inflatable device. The inflator (20) has a relatively large diameter body portion (24) and a relatively small diameter neck portion (40) extending from the body portion. The neck portion (40) has an inflation fluid outlet (42). The occupant protection apparatus (10) also comprises a conduit (50) for directing inflation fluid from the inflator (20) into the inflatable device (14). The conduit (50) has a relatively large diameter main body portion (60) secured on the body portion (24) of the inflator (20) by interfitting portions (80, 34) of the main body portion and the body portion of the inflator. The main body portion (60) of the conduit (50) defines a fluid chamber (70) around the neck portion (40) of the inflator (20). The conduit (50) has a relatively small diameter fill tube portion (54) for location in the inflatable vehicle occupant protection device (14). The conduit has a neck portion (62) extending between the main body portion (60) and the fill tube portion (54). The neck portion (62) of the conduit (50) tapers in diameter from the main body portion (60) to the fill tube portion (54).

17 Claims, 3 Drawing Sheets

SIDE CURTAIN ASSEMBLY INCLUDING FILL TUBE

Background of the Invention

1. Technical Field

The present invention relates to a vehicle occupant protection apparatus. In particular, the present invention relates to a side curtain assembly that includes an inflator and a fill tube.

2. Description of the Prior Art

It is known to inflate an air bag to help protect a vehicle occupant in the event of a vehicle collision. Some vehicles include an air bag in the form of a side curtain which is inflatable downward adjacent the side structure of the vehicle to help protect a vehicle occupant in the event of a side impact to the vehicle.

The side curtain is typically stored in a deflated condition along the roof rail above the side windows of the vehicle. The side curtain is part of a side curtain assembly including an inflator and a fill tube. Upon actuation of the inflator, inflation fluid is directed through the fill tube into the side curtain to inflate the side curtain.

The side curtain assembly typically includes a connector of some type for connecting the inflator to the fill tube. In some modules, a metal connector is welded to the metal inflator. Another type of connector is a clamshell-type clamp that fits over adjacent ends of the inflator and the fill tube to direct inflation fluid from the inflator to the fill tube.

SUMMARY OF THE INVENTION

The present invention is a vehicle occupant protection apparatus for helping to protect an occupant of a vehicle. The occupant protection apparatus comprises an inflatable vehicle occupant protection device having a deflated condition and having an inflated condition. The occupant protection apparatus also comprises an inflator for providing inflation fluid for the inflatable device. The inflator has a relatively large diameter body portion and a relatively small diameter neck portion extending from the body portion. The neck portion has an inflation fluid outlet. The occupant protection apparatus also comprises a conduit for directing inflation fluid from the inflator into the inflatable device. The conduit has a relatively large diameter main body portion secured on the body portion of the inflator by interfitting portions of the main body portion and the body portion of the inflator. The main body portion of the conduit defines a fluid chamber around the neck portion of the inflator. The conduit has a relatively small diameter fill tube portion for location in the inflatable device. The conduit has a neck portion extending between the main body portion and the fill tube portion. The neck portion of the conduit tapers in diameter from the main body portion to the fill tube portion.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION OF EMBODIMENTS OF THE INVENTION

Figure 1:
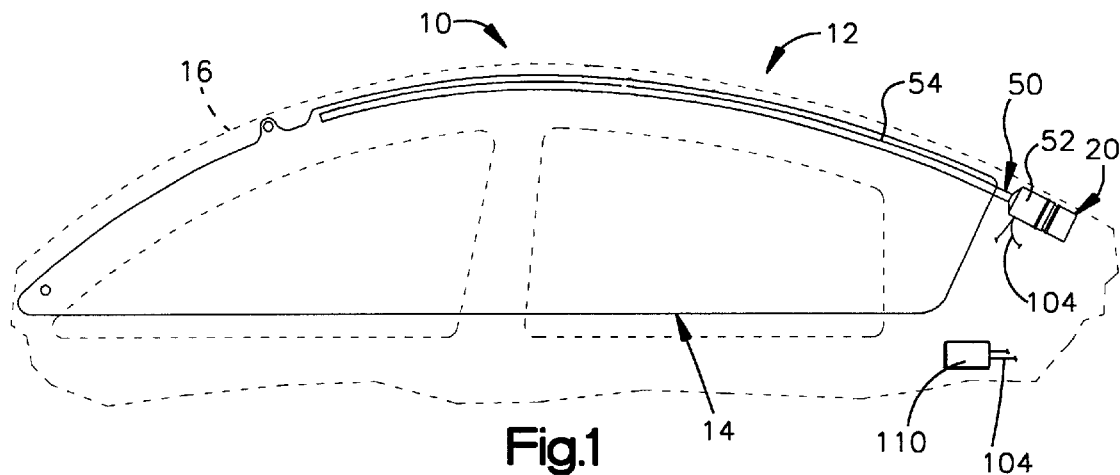
FIG. 1 is a schematic illustration of a vehicle occupant protection apparatus in accordance with a first embodiment of the present invention.

The present invention relates to a vehicle occupant protection apparatus. In particular, the present invention relates a side curtain assembly for helping to protect a vehicle occupant in the event of a side impact to a vehicle or a rollover condition of the vehicle. As representative of the present invention, FIG. 1 illustrates schematically a vehicle occupant protection apparatus or side curtain assembly 10 for helping to protect an occupant of a vehicle 12.

The occupant protection apparatus 10 includes an inflatable vehicle occupant protection device in the form of a side curtain 14. The side curtain 14 is mounted adjacent the side structure 16 of the vehicle 12, including side windows. The side curtain 14 is movable from a deflated and stowed condition (not shown) to an inflated condition as illustrated in FIG. 1. In its inflated condition, the side curtain 14 can help to protect an occupant of the vehicle 12 in the event of a side impact to the vehicle or a rollover condition of the vehicle.

The vehicle occupant protection apparatus 10 also includes an inflator 20 and a conduit 50 for directing inflation fluid from the inflator to the side curtain 14. The inflator 20 preferably contains a stored quantity of pressurized inflation fluid 22 (FIG. 2) in the form of a gas to inflate the side curtain 14. The inflator 20 alternatively could contain a combination of pressurized inflation fluid and ignitable material for heating the inflation fluid, or could be a pyrotechnic inflator which uses the combustion of gas-generating material to generate inflation fluid.

The inflator 20 (FIG. 2) has a cylindrical body portion 24 including a cylindrical, axially extending side wall 26. The side wall 26 is centered on a longitudinal central axis 30 of the inflator 20. The side wall 26 has a cylindrical outer surface 32. A portion 34 of the surface 32 defines a circumferential groove 36 in the side wall 26 of the body portion 24 of the inflator 20.

A cylindrical neck portion 40 of the inflator 20 extends from the body portion 24 of the inflator. The diameter of the neck portion 40 of the inflator 20 is substantially less than the diameter of the body portion 24 of the inflator. The neck portion 40 of the inflator 20 includes a plurality of inflation fluid outlets 42. The neck portion 40 also includes an electrical connector 44 for receiving an electric signal to actuate the inflator 20.

Figure 2:
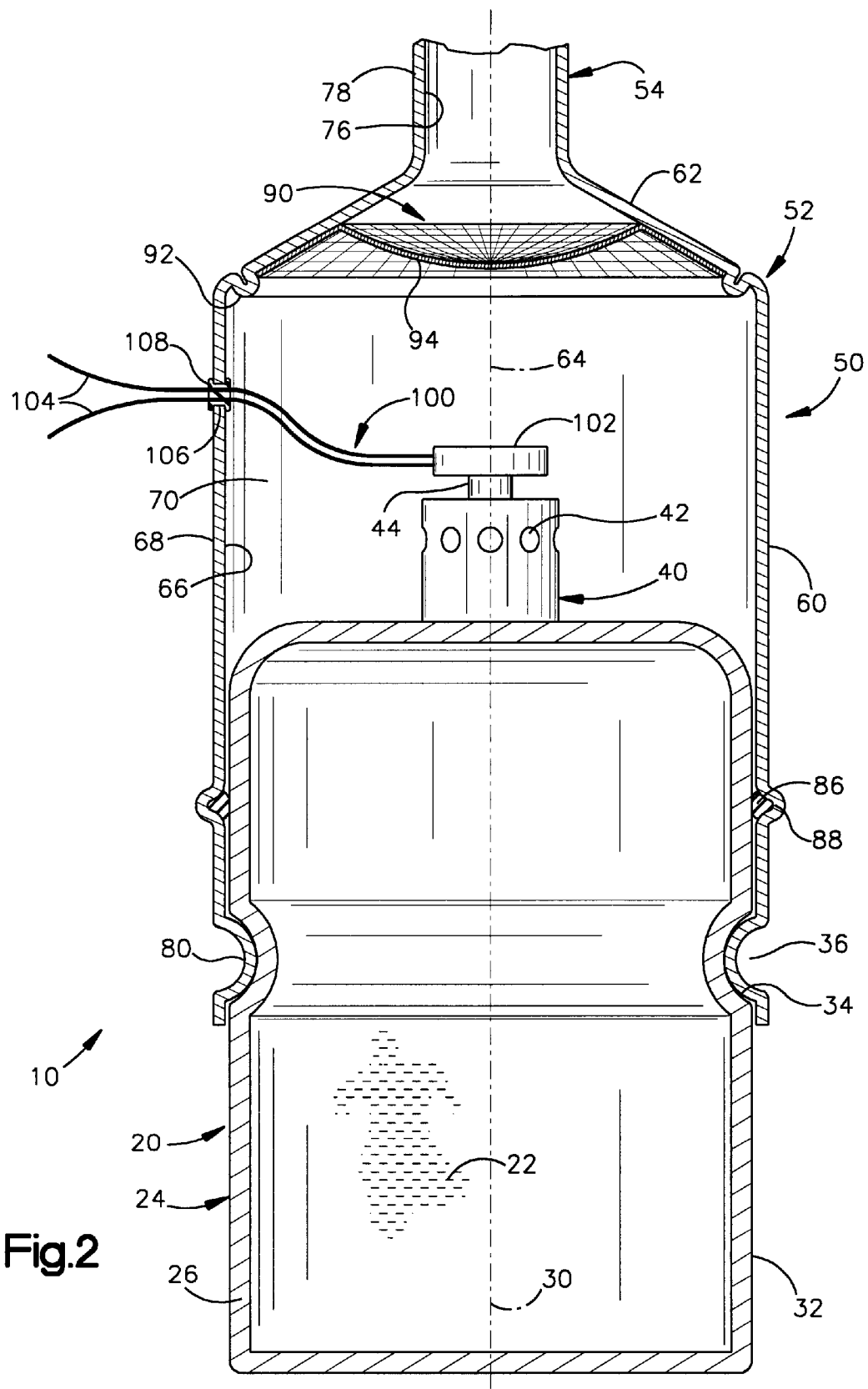
FIG. 2 is an enlarged view of a portion of the occupant protection apparatus of FIG. 1 including an inflator and a conduit.

The conduit 50 includes a funnel portion 52 and a fill tube portion 54. In the conduit 50 illustrated in FIGS. 1 and 2, the funnel portion 52 and the fill tube portion 54 are formed as one piece. The conduit 50 may be formed from a metal, such as aluminum or steel, as shown in FIG. 2.

The funnel portion 52 of the conduit 50 has two contiguous parts 60 and 62 centered on a central axis 64 of the funnel portion. The axis 64 of the funnel portion 52 of the conduit 50 is coincident with the axis 30 of the inflator 20 when the conduit is installed on the inflator as described below. The axis 64 in the illustrated embodiment is linear.

The first part or main body portion 60 of the funnel portion 52 of the conduit 50 has a cylindrical configuration including parallel inner and outer side surfaces 66 and 68 centered on the axis 64. The first part 60 fits closely around the body portion 24 of the inflator 20. The first part 60 also extends axially from the body portion 24 of the inflator 20 to enclose the neck portion 40 of the inflator. The first part 60 is spaced radially outward from the neck portion 40 of the inflator 20 and thus defines a fluid chamber 70 in the funnel portion 52 of the conduit 50. The neck portion 40 of the inflator 20 is located in the fluid chamber 70. As a result, the inflation fluid outlets 42 of the inflator 20 are in fluid communication with the fluid chamber 70 in the interior of the conduit 50.

The second part or neck portion 62 of the funnel portion 52 of the conduit 50 extends from the first part 60. The second part 62 of the funnel portion 52 has a frustoconical configuration centered on the axis 64. The second part 62 reduces in diameter, or tapers, as it extends toward the fill tube portion 54 of the conduit 50.

The fill tube portion 54 of the conduit 50 has a cylindrical configuration including parallel inner and outer side surfaces 76 and 78 centered on the axis 64. The diameter of the fill tube portion 54 is substantially less than the diameter of the first part 60 of the funnel portion 52 of the conduit 50.

The fill tube portion 54 is mounted to and extends along the length of the vehicle side structure 16, and has a curved configuration to match the vehicle side structure. The fill tube portion 54 extends within the side curtain 14 and has fluid outlets (not shown) for directing inflation fluid into the interior of the side curtain.

The conduit 50 and the inflator 20 have interfitting portions which secure the conduit to the inflator. As illustrated, a radially inwardly projecting end portion or lip 80 of the conduit 50 is snapped into engagement with the surface 34 that defines the groove 36 on the body portion 24 of the inflator 20. The engagement of the end portion 80 of the conduit 50 in the groove 36 of the inflator 20 secures the conduit to the inflator. An O-ring 86 in a groove 88 in the first part 60 of the funnel portion 52 of the conduit 50 seals against the outer surface 32 of the side wall 26 of the body portion 24 of the inflator 20. Alternatively, the conduit 50 may be secured to the inflator 20 by electromagnetic forming. If the conduit 50 is made from plastic, the end portion 80 of the conduit may be heated and deformed into the groove 36.

The occupant protection apparatus 10 optionally includes a filter 90 for filtering particulate matter flowing into the conduit 50 from the inflator 20. In the embodiment illustrated in FIG. 2, the filter 90 is a wire screen filter disposed in the conduit. The filter 90 is held in position in the neck portion 62 of the conduit 50 by a lip 92 on the conduit. The central portion 94 of the filter 90 has a domed configuration to provide a larger fluid filtering area than would a flat filter.

An electrical connector assembly 100 is attached to the inflator 20. The electrical connector assembly 100 includes an electrical connector 102 which is secured to the inflator connector 44. Lead wires 104 extend from the connector 102. The lead wires 104 extend through an opening 106 in the funnel portion 52 of the conduit 50. The opening 106 is sealed by a grommet 108. The connector assembly 100 is, preferably, assembled with the conduit 50 prior to securing of the conduit to the inflator 20. The lead wires 104 are made long enough to permit the connector 102 to be attached to the inflator 20 before the conduit 50 is secured to the inflator.

The vehicle 12 includes known means indicated schematically at 110 (FIG. 1) for sensing a side impact to the vehicle, or a rollover condition of the vehicle, and for actuating the inflator 20 in response to the sensing of a collision. The means 110 may include a crash sensor and vehicle electric circuitry for actuating the inflator 20 in response.

In the event of an impact to the vehicle 12 of a magnitude greater than a predetermined threshold value, the sensing means 110 provides an electrical signal over the lead wires 104 to the inflator 20. The inflator 20 is actuated in a known manner and discharges inflation fluid 22 under pressure from the inflation fluid outlets 42. The inflation fluid 22 flows into the fluid chamber 70 in the funnel portion 52 of the conduit 50. The inflation fluid 22 flows through the fluid chamber 70 and into the fill tube portion 54 of the conduit 50. The side curtain 14 inflates under the pressure of the inflation fluid 22 flowing from the fill tube 54.

Figure 3:
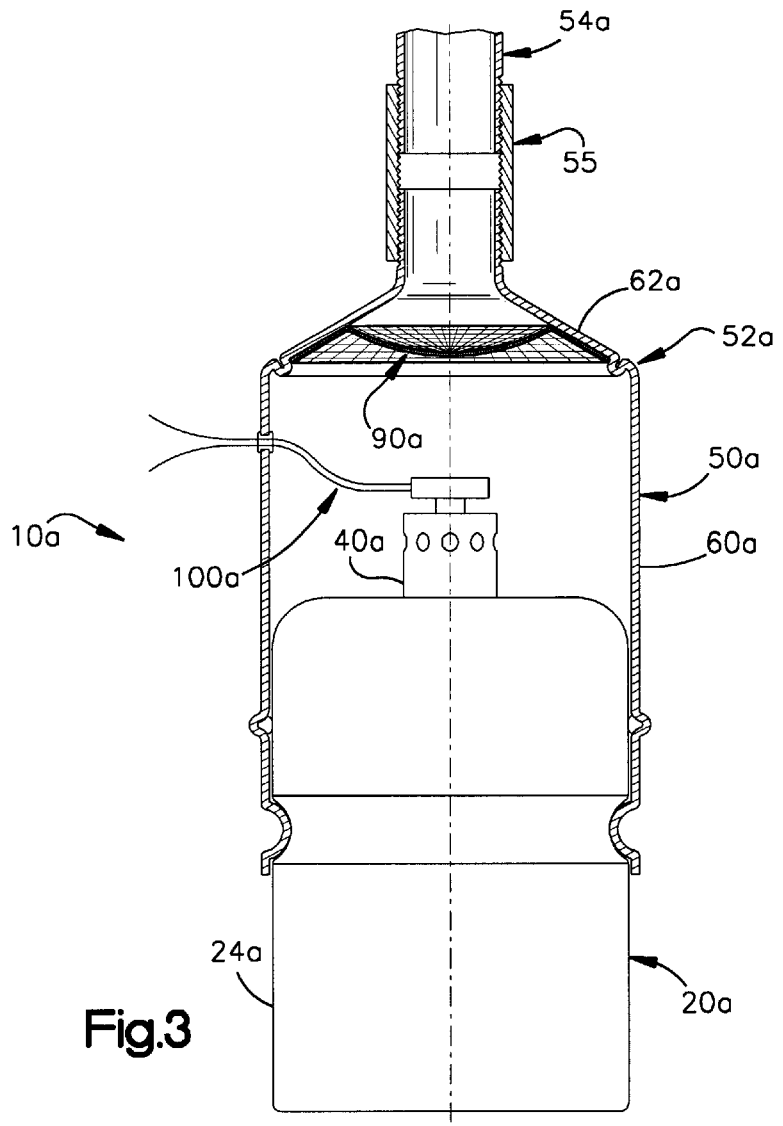
FIG. 3 is a view similar to FIG. 1 showing a vehicle occupant protection apparatus in accordance with a second embodiment of the invention.

FIG. 3 illustrates portions of an occupant protection apparatus 10*a* in accordance with a second embodiment of the invention. The occupant protection apparatus 10*a* is similar in construction and operation to the occupant protection apparatus 10 (FIGS. 1–2), and parts that are the same or similar are given the same reference numerals with the suffix "a" attached.

The occupant protection apparatus 10*a* includes a conduit 50*a* that is made from a plastic material, by a process such as injection molding. The fill tube portion 54*a* of the conduit 50*a* is a separate piece from the funnel portion 52*a*. A threaded union 55 joins the fill tube portion with the funnel portion. The fill tube portion 54*a* and the funnel portion 50*a* may alternatively be joined in another manner, such as with adhesive and a sleeve.

Figure 4:
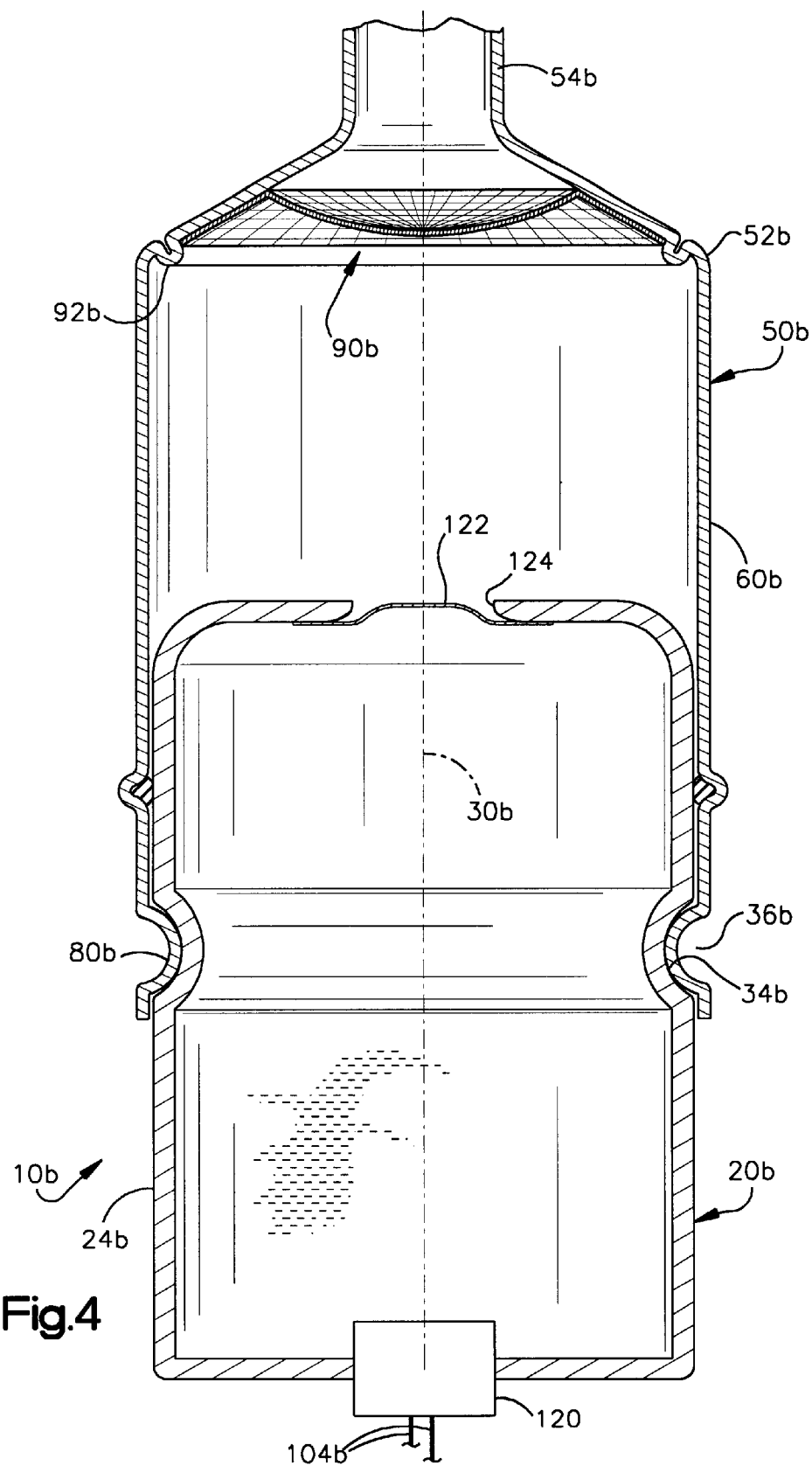
FIG. 4 is a view similar to FIG. 3 showing a vehicle occupant protection apparatus in accordance with a third embodiment of the invention.

FIG. 4 illustrates portions of an occupant protection apparatus 10*b* in accordance with a third embodiment of the invention. The occupant protection apparatus 10*b* is similar in construction and operation to the occupant protection apparatus 10 (FIGS. 1–2), and parts that are the same or similar are given the same reference numerals with the suffix "b" attached.

The occupant protection apparatus 10*b* includes an inflator 20*b* that has an igniter 120 at the end of the inflator opposite the fill tube portion 54*b* of the conduit 50*b*. The inflator 20*b* includes a burst disk or other rupturable portion 122 covering an opening 124 in the inflator and disposed within the funnel portion 52*b* of the conduit 50*b*. Upon actuation of the igniter 120, the fluid pressure inside the inflator 20 increases enough to rupture the burst disk 122. Inflation fluid flows through the opening 124 into the conduit 50*b* and thence into the inflatable device (not shown).

From the above description of the invention, those skilled in the art will perceive improvements, changes and modification in the invention. For example, an occupant protection apparatus in accordance with the present invention can also be used for inflation of a driver's side air bag, a passenger side air bag, or a side impact air bag which is seat mounted or door mounted. Such improvements, changes and modifications within the skill of the art are intended to be covered by the appended claims.

Having described the invention, we claim:

1. A vehicle occupant protection apparatus for helping to protect an occupant of a vehicle, said occupant protection apparatus comprising:

an inflatable vehicle occupant protection device having a deflated condition and having an inflated condition;

an inflator for providing inflation fluid for said inflatable device, said inflator having an inflation fluid outlet at one end;

a conduit for receiving inflation fluid from said inflator, said conduit including a funnel portion and a fill tube portion, said funnel portion directing inflation fluid from said inflator to said fill tube portion, said fill tube portion extending into said inflatable device, a first part of said funnel portion having a relatively large diameter and being fixed to said inflator and defining a fluid chamber around said inflation fluid outlet of said inflator to connect an interior of said funnel portion in fluid communication with said inflation fluid outlet of said inflator, a second part of said funnel portion extending from said first part and tapering in diameter to said fill tube portion of said conduit, said first and second parts of said funnel portion being centered on an axis of said funnel portion, and a seal interposed between said first part of said funnel portion of said conduit and said inflator for preventing inflation fluid from passing between said conduit and said inflator, said first part of said funnel portion of said conduit including a groove for receiving said seal.

2. An apparatus as set forth in claim 1 wherein said inflator has a relatively large diameter body portion and a relatively small diameter neck portion, said neck portion having said inflation fluid outlet.

3. An apparatus as set forth in claim 1 wherein said inflator has a body portion substantially the same diameter as said first part of said funnel portion, said inflation fluid outlet being located on said body portion of said inflator.

4. An apparatus as set forth in claim 1 wherein said conduit is formed as one piece including said funnel portion and said fill tube portion.

5. An apparatus as set forth in claim 1 wherein said fill tube portion of said conduit is plastic and is formed as a separate piece from said funnel portion of said conduit.

6. An apparatus as set forth in claim 1 further comprising a filter located in said conduit for filtering inflation fluid flowing through said conduit.

7. An apparatus as set forth in claim 1 wherein said first part of said funnel portion of said conduit is fixed to said inflator by interfitting portions of said conduit and said inflator, and wherein said interfitting portions include a radially inwardly extending portion of said first part of said funnel portion of said conduit that snaps into engagement with a recessed portion of said inflator.

8. An apparatus as set forth in claim 7 wherein said seal is located between said interfitting portions and said fluid chamber.

9. A vehicle occupant protection apparatus for helping to protect an occupant of a vehicle, said occupant protection apparatus comprising:

an inflatable vehicle occupant protection device having a deflated condition and having an inflated condition;

an inflator for providing inflation fluid for said inflatable device, said inflator having an inflation fluid outlet at one end covered with a burst disk;

a conduit for receiving inflation fluid from said inflator, said conduit including a funnel portion and a fill tube portion, said funnel portion directing inflation fluid from said inflator to said fill tube portion, said fill tube portion extending into said inflatable device, a first part of said funnel portion having a relatively large diameter and being fixed to said inflator and defining a fluid chamber around said inflation fluid outlet of said inflator to connect an interior of said funnel portion in fluid communication with said inflation fluid outlet of said inflator, a second part of said funnel portion extending from said first part and tapering in diameter in a frustoconical configuration to said fill tube portion of said conduit, said first and second parts of said funnel portion being centered on an axis of said funnel portion, said igniter upon igniting, effecting bursting of said burst disk to open said inflation fluid opening, and a filter located in said frustoconical portion of said conduit and for filtering inflation fluid flowing through said conduit and for preventing said burst disk from flowing through said conduit.

10. A vehicle occupant protection apparatus for helping to protect an occupant of a vehicle, said occupant protection apparatus comprising:

an inflatable vehicle occupant protection device having a deflated condition and having an inflated condition;

an inflator for providing inflation fluid for said inflatable device, said inflator having a relatively large diameter body portion and a relatively small diameter neck portion extending from said body portion, said neck portion having an inflation fluid outlet; and a two-piece plastic conduit for directing inflation fluid from said inflator into said protection device, said conduit having a relatively large diameter main body portion, portions of said main body portion of said conduit and said body portion of said inflator non-releasably securing said conduit and said inflator together, said portions comprising a portion of said inflator defining a recess and a deformed portion of said conduit that is deformed into said recess of said inflator, said main body portion of said conduit defining a fluid chamber around said neck portion of said inflator, said conduit having a relatively small diameter fill tube portion for location in said inflatable vehicle occupant protection device, said conduit having a neck portion extending between said main body portion and said fill tube portion, said neck portion of said conduit being conical in shape and reducing in diameter as said neck portion extends from said main body portion to said fill tube portion, said fill tube portion and said neck portion being secured together by a threaded union.

11. A vehicle occupant protection apparatus for helping to protect an occupant of a vehicle, said occupant protection apparatus comprising:

an inflatable vehicle occupant protection device having a deflated condition and having an inflated condition;

an inflator for providing inflation fluid for said inflatable device, said inflator having an inflation fluid outlet at one end covered with a burst disk and an igniter at another end;

a conduit for receiving inflation fluid from said inflator, said conduit including a funnel portion and a fill tube portion, said funnel portion directing inflation fluid from said inflator to said fill tube portion, said fill tube portion extending into said inflatable device, a first part of said funnel portion having a relatively large diameter and being fixed to said inflator and defining a fluid chamber around said inflation fluid outlet of said inflator to connect an interior of said funnel portion in fluid communication with said inflation fluid outlet of said inflator, a second part of said funnel portion extending from said first part and tapering in diameter in a frustoconical configuration to said fill tube portion of said conduit, said first and second parts of said funnel portion being centered on an axis of said funnel portion, said igniter igniting said inflation fluid in said inflator upon a vehicle collision, said burst disk bursting upon an increase in pressure in said inflator to open said inflation fluid opening, and a filter located in said frustoconical portion of said conduit and for filtering inflation fluid flowing through said conduit and for preventing said burst disk from flowing through said conduit, said conduit having a lip portion engaging said filter and for holding said filter in position in said frustoconical portion of said conduit.

12. An apparatus as set forth in claim 11 wherein said inflator has a body portion substantially the same diameter as said first part of said funnel portion, said inflation fluid outlet being located on said body portion of said inflator.

13. An apparatus as set forth in claim 11 wherein said conduit is formed as one piece including said funnel portion and said fill tube portion.

14. An apparatus as set forth in claim 11 wherein said fill tube portion of said conduit is formed as a separate piece from said funnel portion of said conduit.

15. An apparatus as set forth in claim 11 wherein said first part of said funnel portion of said conduit is fixed to said inflator by intermitting portions of said conduit and said inflator, and wherein said interfitting portions include a radially inwardly extending portion of said first part of said funnel portion of said conduit that snaps into engagement with a recessed portion of said inflator.

16. An apparatus as set forth in claim 15 wherein said seal is located between said interfitting portions and said fluid chamber.

17. A vehicle occupant protection apparatus for helping to protect an occupant of a vehicle, said occupant protection apparatus comprising:

an inflatable vehicle occupant protection device having a deflated condition and having an inflated condition;

a source of inflation fluid for said inflatable device, said source of inflation fluid having a relatively large diameter body portion and a relatively small diameter first neck portion extending from said body portion, said first neck portion having an inflation fluid outlet, said body portion defining an annular recess;

a structure enclosing said inflation fluid source and defining an inflation fluid chamber, said structure having a radially inwardly projecting lip in an interfitting connection with said annular recess of said inflation fluid source to secure said structure and said inflation fluid source together; and a seal and an annular groove in said structure for said seal for preventing inflation fluid from escaping said inflation fluid chamber between said interfitting connection between said inflation fluid source and said structure when said inflation fluid source inflates said inflatable vehicle occupant protection device into said inflated condition, said structure having a relatively large diameter main body portion, said lip being located on said main body portion of said structure and said recess being located on said body portion of said inflation fluid source, said structure having a relatively small diameter fill tube portion for location in said inflatable vehicle occupant protection device, said structure having a second neck portion extending between said main body portion and said fill tube portion, said second neck portion of said structure being conical in shape and reducing in diameter as said second neck portion extends from said main body portion to said fill tube portion, said second neck portion being downstream of said inflation fluid outlet and having inflation fluid act thereon as the inflation fluid flows from said inflation fluid outlet into said fill tube portion.

* * * * *